United States Patent
He et al.

(10) Patent No.: US 10,164,863 B2
(45) Date of Patent: *Dec. 25, 2018

(54) INTER-CHASSIS PEER AND METHOD USED THEREIN

(71) Applicant: Telefonaktiebolaget LM Ericsson (publ), Stockholm (SE)

(72) Inventors: Jiang He, Beijing (CN); Baifeng Cui, Beijing (CN); Ying Lu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 20 days.

This patent is subject to a terminal disclaimer.

(21) Appl. No.: 15/021,421

(22) PCT Filed: Sep. 11, 2013

(86) PCT No.: PCT/CN2013/083305
§ 371 (c)(1),
(2) Date: Mar. 11, 2016

(87) PCT Pub. No.: WO2015/035570
PCT Pub. Date: Mar. 19, 2015

(65) Prior Publication Data
US 2016/0226748 A1     Aug. 4, 2016

(51) Int. Cl.
*H04L 12/751* (2013.01)
*H04L 29/08* (2006.01)
*H04L 12/46* (2006.01)

(52) U.S. Cl.
CPC .......... *H04L 45/02* (2013.01); *H04L 12/4675* (2013.01); *H04L 69/324* (2013.01)

(58) Field of Classification Search
CPC .... H04L 45/02; H04L 69/324; H04L 12/4675
See application file for complete search history.

(56) References Cited

U.S. PATENT DOCUMENTS 8,139,492 B1 * 3/2012 Peterson ................. H04L 45/00
370/238
8,161,185 B2    4/2012 Wells
(Continued)

FOREIGN PATENT DOCUMENTS

| CN | 1494270 A | 5/2004 |
|---|---|---|
| CN | 1859431 A | 11/2006 |

(Continued)

OTHER PUBLICATIONS

International Preliminary Report on Patentability for International Patent Application No. PCT/CN2013/083305, dated Mar. 24, 2016, 6 pages.

(Continued)

*Primary Examiner* — Gbemileke J Onamuti
(74) *Attorney, Agent, or Firm* — Patent Portfolio Builders, PLLC

(57) ABSTRACT

The disclosure relates to a method of LSP number planning in an inter-chassis device comprising a plurality of peers. In one embodiment, the method comprises steps of generating an LSP and transmitting the generated LSP outside at a peer. The LSP number in the generated LSP is a number in a number range assigned to that peer. The number ranges assigned to different peers of the inter-chassis device do not overlap with each other. By the LSP number planning method, the peer may discover automatically other peers in the same inter-chassis, and announce itself independently.

12 Claims, 8 Drawing Sheets

(56) References Cited

U.S. PATENT DOCUMENTS

| | | | |
|---|---|---|---|
| 8,782,226 B2 * | 7/2014 | Christian | H04L 29/12009 709/225 |
| 2007/0250640 A1 | 10/2007 | Wells | |
| 2011/0022728 A1 | 1/2011 | Kern et al. | |
| 2011/0032945 A1 | 2/2011 | Mullooly et al. | |
| 2013/0003731 A1 | 1/2013 | Lu et al. | |
| 2014/0086097 A1 * | 3/2014 | Qu | H04L 45/026 370/254 |
| 2016/0119229 A1 | 4/2016 | Zhou | |
| 2016/0226748 A1 | 8/2016 | He et al. | |
| 2016/0301594 A1 * | 10/2016 | He | H04L 45/025 |

FOREIGN PATENT DOCUMENTS

| | | |
|---|---|---|
| CN | 101141330 A | 3/2008 |
| CN | 101350789 A | 1/2009 |
| CN | 102065058 A | 5/2011 |
| CN | 102484611 A | 5/2012 |
| WO | 2015081565 A1 | 6/2015 |

OTHER PUBLICATIONS

Author Unknown, "OSI IS-IS Intra-domain Routing Protocol," ISO DP 10589, Network Working Group, RFC: 1142, Feb. 1990, Digital Equipment Corporation, 157 pages.

International Search Report and Written Opinion for International Patent Application No. PCT/CN2013/083305, dated Jun. 26, 2014, 12 pages.

Coltun, Rob, et al., "OSPF for IPv6," Network Working Group, Requests for Comments: 2740, Category: Standards Track, Dec. 1999, The Internet Society, 72 pages.

International Search Report and Written Opinion for International Patent Application No. PCT/CN2013/088793, dated Sep. 16, 2014, 11 pages.

International Preliminary Report on Patentability for International Patent Application No. PCT/CN2013/088793, dated Jun. 16, 2016, 5 pages.

Non-Final Office Action for U.S. Appl. No. 15/038,556, dated Jul. 3, 2017, 21 pages.

Non-Final Office Action for U.S. Appl. No. 15/038,556, dated Feb. 2, 2018, 25 pages.

* cited by examiner

INTER-CHASSIS PEER AND METHOD USED THEREIN

This application is a 35 U.S.C. § 371 national phase filing of International Application No. PCT/CN2013/083305, filed Sep. 11, 2013, the disclosure of which is incorporated herein by reference in its entirety.

TECHNICAL FIELD

The disclosure relates to a peer in an inter-chassis device. In particular, the disclosure relates to a Link State Protocol Data Unit (PDU) (LSP) number planning for peers in an inter-chassis device.

BACKGROUND

Unless otherwise indicated herein, the approaches described in this section are not prior art to the claims in this disclosure and are not admitted to be prior art by inclusion in this section.

Network availability is a critical metric for service providers as it has a direct bearing on their profitability. Outages translate not only to lost revenue but also to potential penalties mandated by contractual agreements with customers running mission-critical applications that require tight Service Level Agreements (SLAs). This is true for any carrier network, and networks employing Layer2 Virtual Private Network (L2VPN) technology are no exception. Network high-availability can be achieved by employing intra and inter-chassis redundancy mechanisms. The inter-chassis redundancy mechanism allows set of two or more peers forming an inter-chassis device.

An inter-chassis device appears to be a logical device but actually consists of several physical devices to form a redundancy group. All the devices in the inter-chassis device are configured as peers to others. Peers in the inter-chassis device could be directly connected or indirectly connected.

Referring to FIG. 1, the left portion illustrates the physical view of an inter-chassis device, while the right portion illustrates the logical view of the inter-chassis device. As shown in FIG. 1, both Node A and Node B are connected physically to Node D. In logical, the two nodes act as one node to Node D, i.e., Node AB, as shown in right side of FIG. 1.

When deployed under Intermediate system-Intermediate system (IS-IS) protocol, the inter-chassis device (for example, Node AB) appears as one Intermediate System in the topology. Node A and Node B (referred as Peer A and Peer B hereunder) are peers to each other in Node AB.

There is no automatic discovery mechanism for peers in an inter-chassis device under IS-IS environment. The peers' addresses are manually configured.

SUMMARY

An object of the disclosure is to provide a method used at peers in an inter-chassis device, by which such peers are possible to automatically discover other peers in the inter-chassis device, and thus there is no need to manual operations on peers' addresses.

An object of the disclosure is to provide a method used at peers in an inter-chassis device and such peers that are capable of automatically discovering other peers in the inter-chassis device, and there is no need to manual operations on peers' addresses, which is convenient to the manager of the network.

According to a first aspect, there is provided a method at a peer in an inter-chassis device which comprises a plurality of peers. The peer generates an LSP, where the LSP number in the generated LSP is selected from a number range assigned thereto. The peer then transmits the generated LSP. The number ranges assigned to different peers in the inter-chassis device do not overlap with each other. So, LSPs generated by respective peers in one and the same inter-chassis device do not conflict with each other. A peer thus may announce itself independently, without synchronization among peers.

Preferably, there is a specific number that is not assigned to any of the peers. The peer further generates and transmits an LSP with that specific LSP number. It is preferable that LSP with the specific LSP number generated by each of the plurality of peers includes the same information, such as information about the inter-chassis device itself. Thus, another node that receives LSPs with the specific LSP number generated by different peers in an inter-chassis device takes the later LSP as an update to the previous one, thereby reducing the storage capacity of the node.

Preferably, the specific LSP number is selected to be zero.

Preferably, the LSP with an LSP number within the assigned number range includes peer-specific information, especially peer-specific topology information of the inter-chassis device. Thus, another node that receives LSPs with the assigned LSP numbers generated by different peers in an inter-chassis device takes the LSPs as different LSP from the inter-chassis device. There is no confusion.

In the case that the peer receives an LSP, it compares the LSP number in the received LSP with the number range assigned thereto if the SOURCE ID field in the received LSP indicates it comes from the same inter-chassis device as the peer. It determines that the received LSP is transmitted from another peer in the same inter-chassis device if the LSP number is not in the number range. If the LSP number falls in the number range, it is determined that the received LSP is locally generated. Thus, a peer may automatically discovery other peers by looking into the LSP number included in the LSP.

According to a second aspect, there is provided a peer in an inter-chassis device which comprises a plurality of peers. The peer comprises a generator that generates an LSP and a transceiver that transmits the generated LSP. The generated LSP has an LSP number that is selected from a number range assigned to the peer. The number ranges assigned to different peers in the same inter-chassis device do not overlap with each other.

According to a third aspect, there is provided a peer in an inter-chassis device which comprises a plurality of peers. The peer comprises a communication interface arrange for communication, a processor and a memory storing computer program code thereon. The program, when run in the processor, causes the peer to select a number in a number range assigned thereto, and generate an LSP by using the selected number as the LSP number. The number range assigned to different peers in the inter-chassis device do not overlap with each other.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Figure 2:
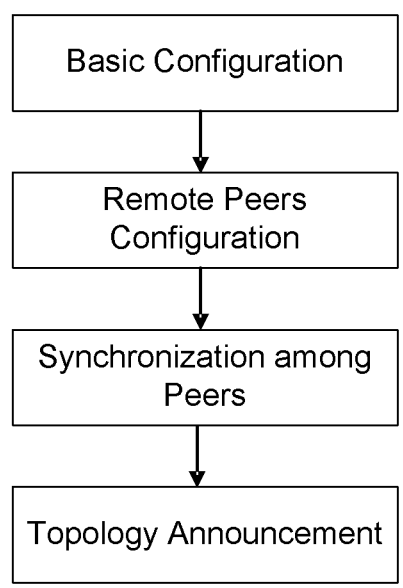
FIG. 2 illustrates a flowchart of an inter-chassis device announcement method in the prior art.

As shown in FIG. 2, in a network comprising an inter-chassis device, the administrator of the network shall perform basic configuration manually by such as, configuring addresses of each systems including inter-chassis devices. Then, the administrator performs remote peer configurations to peers of the inter-chassis device. Peers of the inter-chassis device subsequently perform synchronization to be synchronous with each other. Finally, the peers may generate and transmit LSPs to announce the topology of the inter-chassis device.

LSPs are generated by an inter-chassis device and propagated through an area to distribute link status. An example of the format of an LSP is defined in Reference [1] (RFC 1142, "OSI IS-IS Intra-domain routing Protocol," February, 1990) which is incorporated herein by reference, as shown in table I below.

TABLE I

| LSP Format |
| --- |
| INTRADOMAIN ROUTEING PROTOCOL DISCRIMINATOR |
| LENGTH INDICATOR |
| VERSION/PROTOCOL IN EXT |
| RESERVED |
| R    R       R       TYPE |
| VERSION |
| ECO |
| USER ECO |
| PDU LENGTH |
| REMAINING LIFETIME |
| LSP ID |
| SEQUENCE NUMBER |
| CHECKSUM |
| P    ATT    HIPPITY    IS TYPE |
| VARIABLE LENGTH FIELDS |

Reference 1 also defines the structure of the LSP ID. In particular, the LSP ID is structured by a SOURCE ID field, a PSEUDONODE ID field and an LSP NUMBER field, as shown in Table II below.

TABLE II

| LSP ID Structure |
| --- |
| SOURCE ID |
| PSEUDONODE ID |
| LSP NUMBER |

When an inter-chassis device tries to announce itself in networks using IS-IS protocol before synchronization of peers, LSPs from different peers using the same LSP number will confuse neighbors because the different peers will generally choose same range of LSP number. Take the network shown in FIG. 1 as an example. Peer A and B have different neighbors, and thus they both uses an LSP with LSP number=1 to announce itself. Node C receives the two LSPs from the same node because Peer A and B are regarded as one logical node, and finds that LSP numbers of the two LSPs are the same but the content in the two LSPs are different. Therefore, link status database on node C is undetermined.

In Reference 1, it is specified that each peer of an inter-chassis device selects a number as the LPS number in generating an LSP, and the selection of the number is independent. The number is a 4 octet unsigned value. The number increases from zero to 255. Accordingly, there may be cases where two peers generate and transmit LSPs having the same LSP number. A node that receives the LSPs will be confused by the LSPs.

A different LSP number planning for peers is proposed according to the disclosure.

Figure 3:
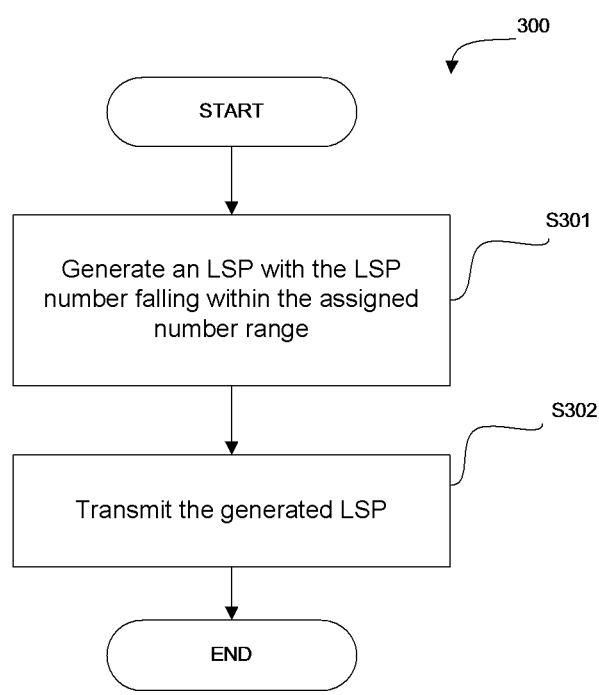
FIG. 3 illustrates a flowchart of a method according to an embodiment of the disclosure.

FIG. 3 illustrates a flowchart of a method 300 according to an embodiment of the disclosure. As shown in FIG. 3, the method 300 starts and a peer in the inter-chassis device generates an LSP at step S301, and it transmits the generated LSP outside. The procedure of the peer generating and transmitting an LSP is compliant with the existing IS-IS protocol. The difference lies in the LSP number.

In the method according to an embodiment of the disclosure, the administrator firstly decides a number range to be assigned to each peer in the inter-chassis device. The assignment of the number ranges may depend on the possible numbers of peers in the inter-chassis. For example, if it is expected that there may be 8 peers in the inter-chassis, a number range including 30 numerals may be assigned to each peer. In particularly, a peer may be assigned with [1-30], another may be assigned with [31-60]. If a third peer joins in the inter-chassis device later, it may be assigned with [61-90] or [91-120] that have not been assigned. The participation of new peers in the inter-chassis device would not need operations or changes on the existing peers in the device. The number range assigned to each peer is different, and does not overlap with each other. The numbers in the number range may be continuous, or discontinuous. For example, take the same 8-peer scenario as an example. A peer may be assigned with [1-10], [21-30] and [41-50] while another peer is assigned with [11-20], [31-[40] and [51-60].

Figure 4:
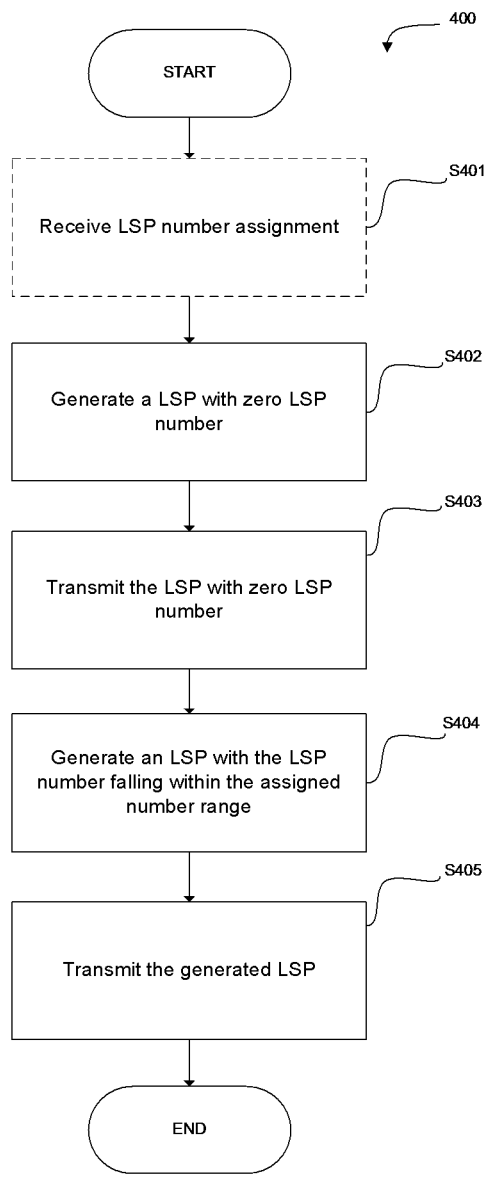
FIG. 4 illustrates a flowchart of another method according to an embodiment of the disclosure.

FIG. 4 illustrates a flowchart of another method 400 according to an embodiment of the disclosure. Each peer in the inter-chassis device firstly receives an LSP number assignment at step S401. Then, the peer generates an LSP with zero LSP number at step S402, and transmits it at step S403. Steps S404 and S405 in FIG. 4 are similar to Step S301 and Step S302, of FIG. 3, respectively.

In the examples described above in conjunction with FIG. 3, zero is not assigned to any of the peers. However, each peer generates an LSP with zero number. It is preferable that the LSP with zero LSP number generated by each peer contains same information. In particularly, the LSP with zero LSP number contains information on the inter-chassis device. For example, the LSP with zero LSP number may contain following information:

a) The setting of the "Infinite Hippity Cost" bit.
b) The value of the Intermediate system Type field.
c) The Area Addresses option.

The LSP generated at step S404, i.e., the LSP with an LSP number within the assigned number range includes information specific to that peer that generates the LSP. In particular, the LSP includes peer-specific topology information of the inter-chassis device.

Figure 5:
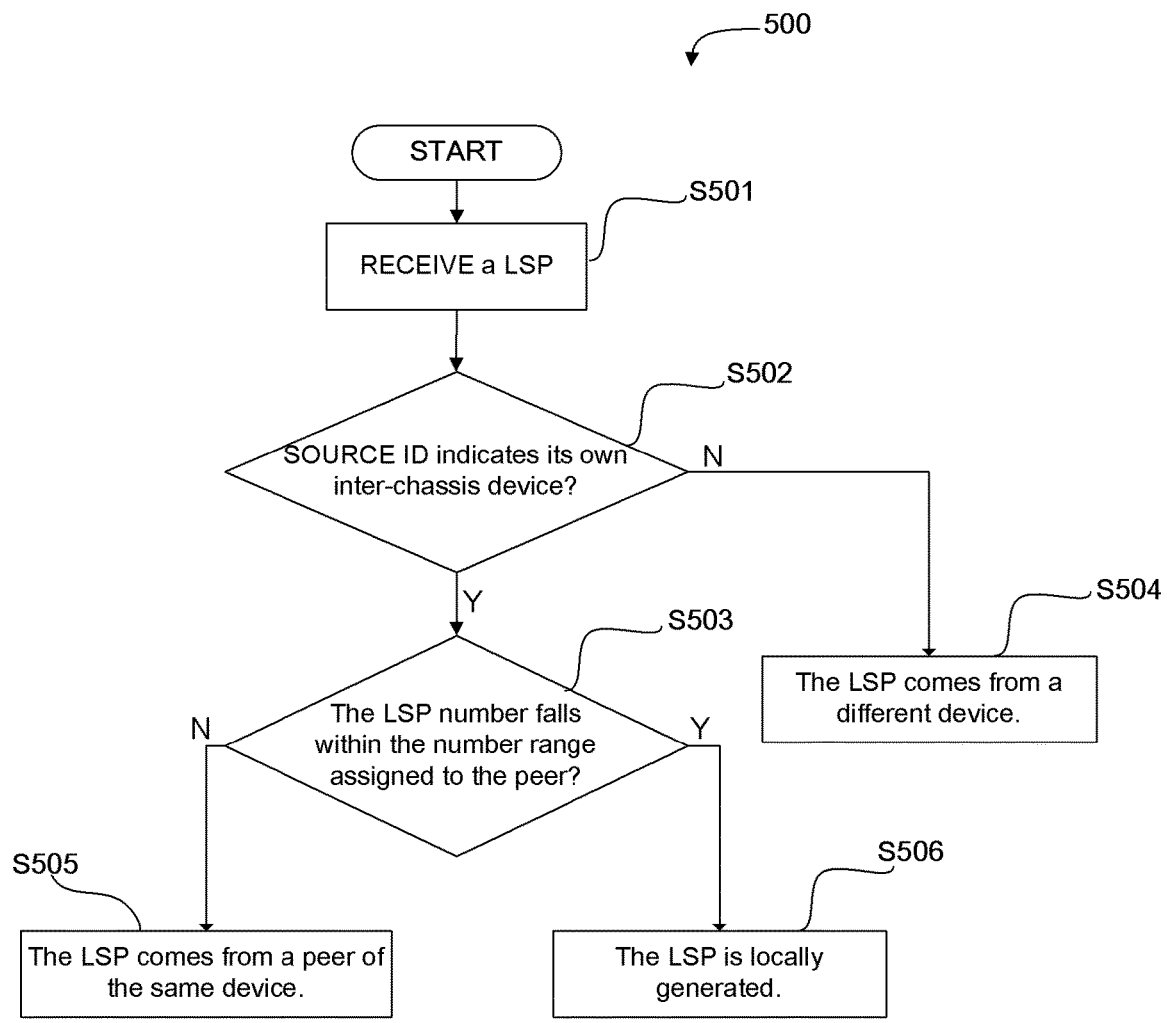
FIG. 5 shows a flowchart of a peer discovery method according to an embodiment of the disclosure.

FIG. 5 shows a flowchart of a peer discovery method 500 according to an embodiment of the disclosure.

In the method 500, a peer of an inter-chassis device receives an LSP at step 501. It checks SOURCE ID field in the LSP at step 502. If the SOURCE ID field in the received LSP indicates that it comes from the same inter-chassis device as the peer, it compares the LSP number in the received LSP with the number range assigned thereto at step S503. It determines that the received LSP is transmitted from another peer in the same inter-chassis device at step S505 if the LSP number is not in the number range; otherwise, it determines that the LSP is locally generated at step S506. If it finds that the SOURCE ID field in the received LSP indicates a different inter-chassis device at step S502, it determines that the LSP comes from a different Intermediate System (IS) at step S504.

Figure 6:
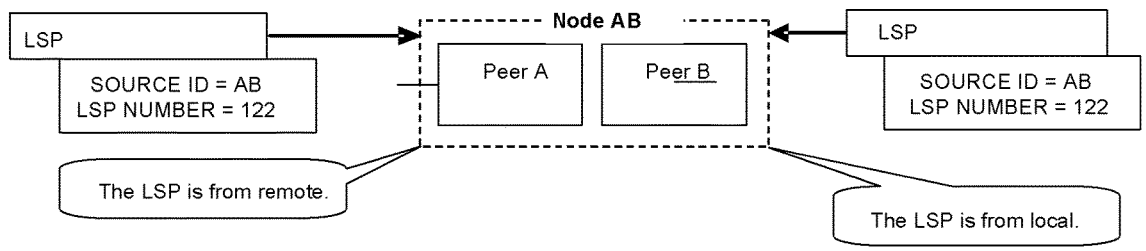
FIG. 6 illustrates an exemplary result according to the method shown in FIG. 5.

FIG. 6 illustrates an exemplary result according to the method shown in FIG. 5. As shown in FIG. 6, Peer A and Peer B constitute an inter-chassis device, i.e., Node AB. Peer A is assigned with the number range of [1-100] and Peer B is assigned with the number range of [101-200]. When Peer A receives an LSP with LSP number=122 and SOURCE ID=AB, it determines that the LSP is not generated locally because the LSP number is not in the number range [1-100]. It determines that the LSP comes from another peer in the same inter-chassis device from the SOURCE ID=AB. When Peer B receives an LSP with LSP number=122 and SOURCE ID=AB, it determines that the LSP is generated locally because the LSP number falls in the number range [101-122] and the SOURCE ID field indicates it comes from the same inter-chassis device.

Figure 1:
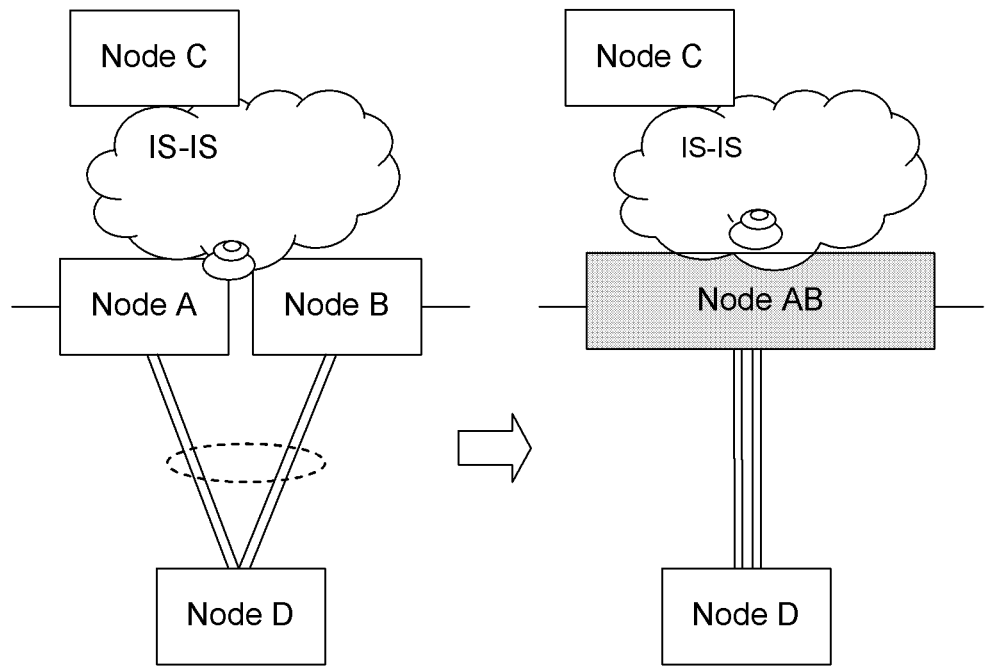
FIG. 1 illustrates a typical inter-chassis device in a network.
Figure 7:
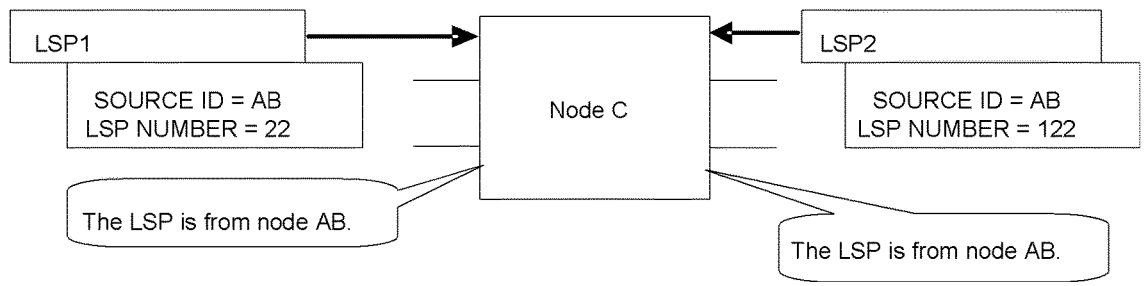
FIG. 7 illustrates another exemplary result according to the method shown in FIG. 5.

FIG. 7 illustrates another exemplary result according to the method shown in FIG. 5. Node C is connected to the inter-chassis device constituted by Peer A and Peer B of FIG. 6, as shown in FIG. 1. When Node C receives LSP 1 with LSP number=22 and SOURCE ID=AB, it determines that the LSP comes from Node AB based on the SOURCE ID field. When Node C receives LSP 2 with LSP number=122 and SOURCE ID=AB some time later, it determines that the LSP comes from Node AB based on the SOURCE ID field. Because the LSP number is different from the previous one, Node C regards the LSP with LSP number=122 as a new LSP.

When Node C receives an LSP with LSP number of zero, which is actually generated by Peer A in Node AB, it determines that it comes from Node AB. When Node C receives an LSP with LSP number of zero, which is actually generated by Peer B in Node AB, it determines that it is an update to the previous LSP with LSP number of zero. In an embodiment of the disclosure, the information contained in the LSP with LSP number of zero from peers in the same inter-chassis device is the same, i.e., the information about the inter-chassis device itself. The information contained in the LSP with non-zero LSP number from peers in the same inter-chassis device is different, i.e., the peer-specific topology information. In such a way, the conflict that otherwise may be raised is cancelled by the different LSP number ranges, and the storage and processing capacity (such as, of Node C) keep to be minimal because the common information is carried in the same LSP (i.e., LSP with LSP number of zero).

Figure 8:
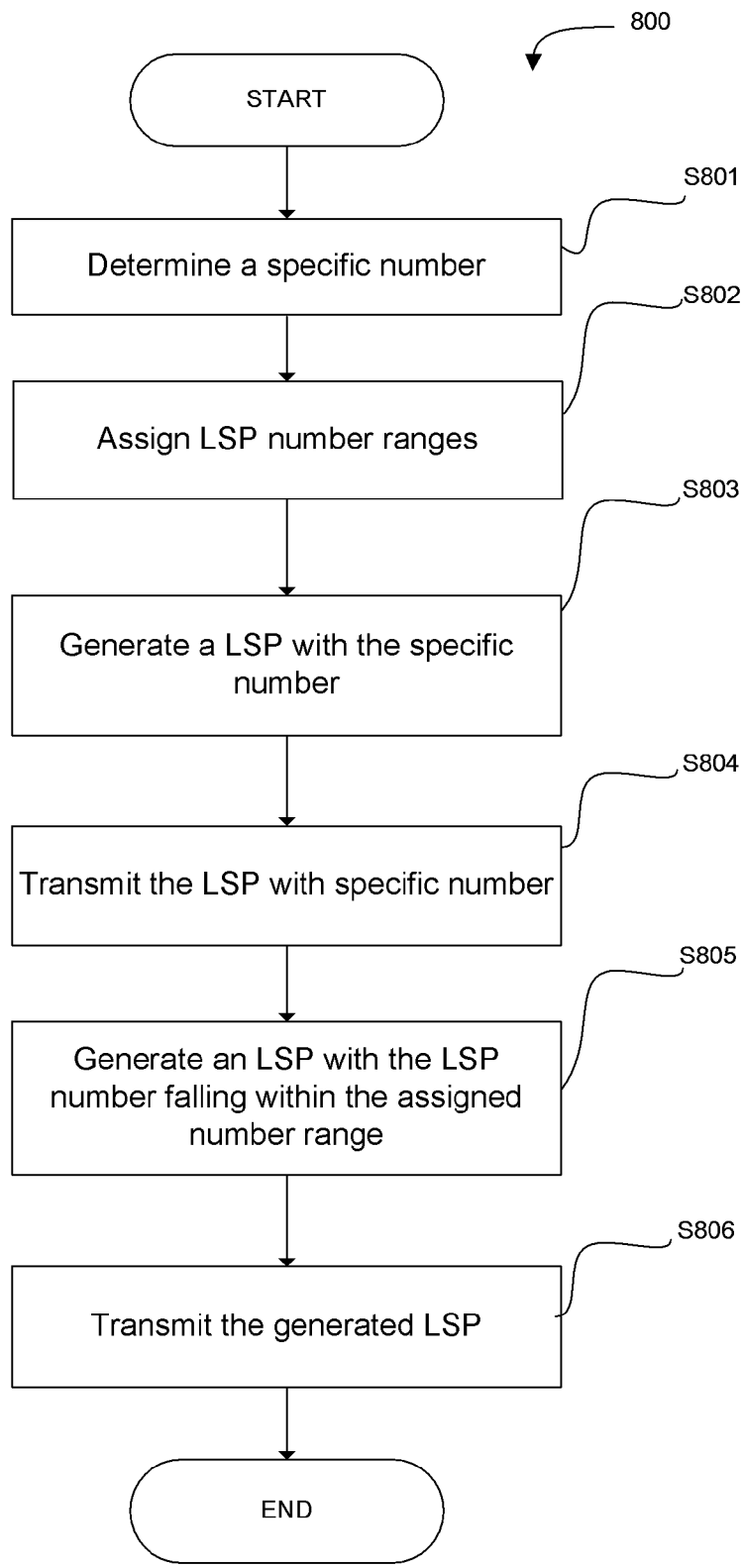
FIG. 8 shows a flowchart of another method according to an embodiment of the disclosure.

In the embodiments described above, the common LSP among peers of an inter-chassis device is assigned with LSP number of zero. It is obvious that it is not limited to zero. Any specific number in the whole number range may be selected and reserved as the LSP number of the common LSP. FIG. 8 shows a flowchart of a method 800 according to an embodiment of the disclosure. As shown in FIG. 8, the administrator of the network firstly determines a specific number to be reserved for the common LSP at step S801. The administrator of the network then determines the number ranges to be assigned to each peer and assign the determined number range at step S802. The number ranges do not include the specific number, and do not overlap with each other. Then each of peers of the inter-chassis device generates an LSP with the specific LSP number to contain the inter-chassis information at step S803 and transmits the LSP at step S804. Each of peers of the inter-chassis device also generates LSPs with LSP number within its assigned number range to contain its topology information at step S805, and transmit the generated LSPs at step S806. In a specific embodiment, the specific number may be 255, for example.

The methods according to the disclosure described above may be performed by any suitable components or other means capable of performing the corresponding functions of the methods. For example, the methods may be performed at any peer of the inter-chassis device, illustrated below in FIG. 9.

Figure 9:
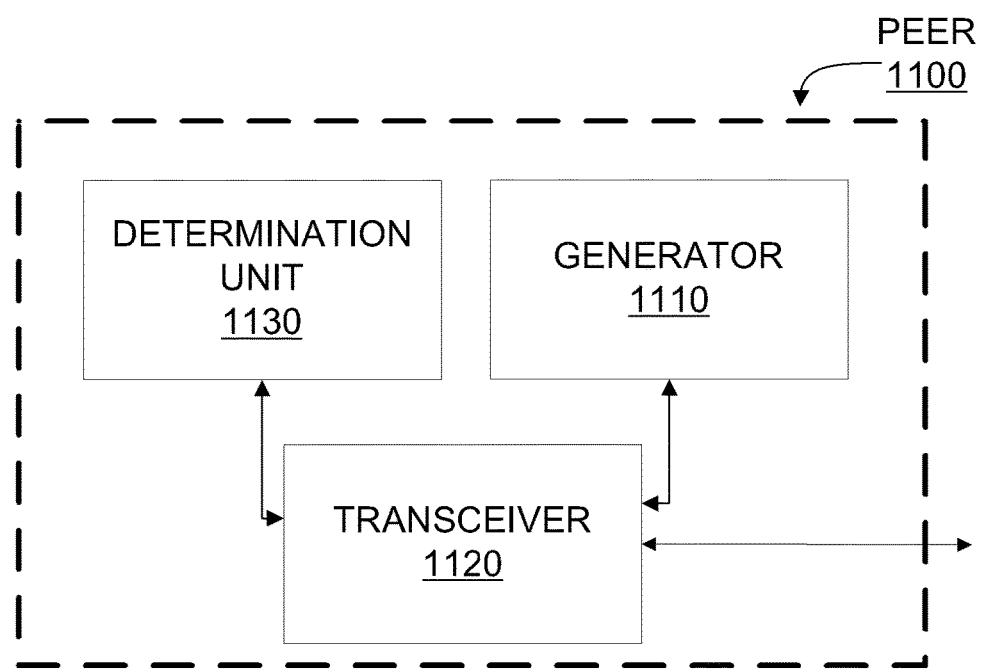
FIG. 9 illustrates a block diagram of a peer according to an embodiment of the disclosure.

FIG. 9 illustrates a block diagram of Peer 1100 according to an embodiment of the disclosure. As shown in FIG. 9, Peer 1100 comprises a generator 1110 and a transceiver 1120. The generator 1110 is configured to generate an LSP, where the LSP number in the generated LSP being selected from the number range assigned to peer 1110. The transceiver 1120 is configured to transmit the generated LSP. In the embodiment of the disclosure, the generator 1110 is further configured to generate an LSP with a specific LSP number that is reserved and not assigned to any of peers. The information contained in the LSP with assigned LSP number includes the topology information of Peer 1100, while the information contained in the LSP with the specific LSP number includes information on the inter-chassis device itself.

According to an embodiment of the disclosure, peer 1110 may further comprise a determination unit 1130 which is configured to compare the LSP number in a received LSP with the number range assigned to peer 1110 when peer 1110 receives the LSP and the SOURCE ID field in the LSP indicates that it comes from the same inter-chassis device as Peer 1100. If the LSP number falls in the assigned number range, it determines that the received LSP is generated by Peer 1100 itself. If the LSP number does not fall in the assigned number range, it determines that the received LSP is generated by another peer in the same inter-chassis device.

FIG. 9 does not show the configuration in a unit of hardware but shows the block in a function unit. It should be noted that Peer 1100 of FIG. 9 may include more or fewer elements than shown, in various arrangements, and each component may be implemented in hardware, software or combination thereof.

Figure 10:
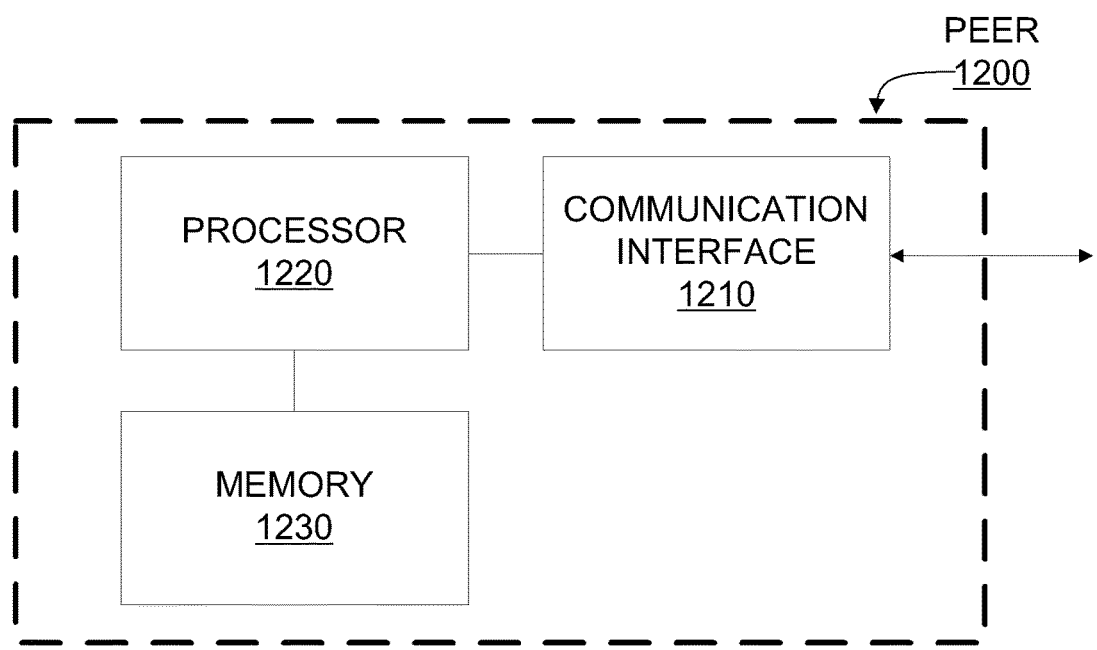
FIG. 10 is a schematic view of a peer according to an embodiment of the disclosure.

FIG. 10 is a schematic view of Peer 1200 according to an embodiment of the disclosure. Peer 1200 comprises a controller or a processor 1220 comprising e.g., any suitable Central Processing Unit, CPU, microcontroller, Digital Signal Processor, DSP, etc., capable of executing computer program code. The computer program code may be stored in a memory 1230. The memory 1230 may be any combination a Read And write Memory, RAM, and a Read Only Memory, ROM. The memory may also comprise persistent storage, which, for example, can be any single one or combination of magnetic memory, optical memory, or solid state memory or even remotely mounted memory. The exemplary Peer 1200 further comprises a communication interface 1210 arranged for wireless communication or wired communication with other devices or nodes, such as other peers in the same inter-chassis device or other nodes (such as Node C).

The computer program code, when loaded from the memory 1230 and run in the processor 1220, causes Peer 1200 to perform the methods according to the disclosure, such as methods 300, 400 and 500. In an embodiment, the computer program code, when executed, cause Peer 1100 to select a number in a number range assigned to Peer 1200, and then generate an LSP by using the selected number as the LSP number. The number ranges assigned to different peers of one inter-chassis do not overlap with each other. In another embodiment of the disclosure, the computer program code may cause Peer 1200 to generate an LSP with a specific LSP number which is reserved and not assigned to any of the peers. The information contained in the LSP with assigned LSP number includes the topology information of peer 1200, while the information contained in the LSP with the specific LSP number includes information on the inter-chassis device itself. When Peer 1200 receives an LSP via the communication interface, the computer program code further causes it to compare the LSP number in the received LSP with the number range assigned to Peer 1200 if the SOURCE ID field in the received LSP indicates that it comes from the same inter-chassis device as Peer 1200. If the LSP number falls in the assigned number range, Peer 1200 determines that the received LSP is generated by peer 1200 itself. If the LSP number does not fall in the assigned number range, Peer 1200 determines that the received LSP is generated by another peer in the same inter-chassis device.

According to the embodiments of the disclosure, a peer may automatically discover other peers by the LSP number contained in a received LSP. Accordingly, there is no need for the administrator to perform remote peer configuration operation. Furthermore, when a new peer joins in the inter-chassis device, other peers in the inter-chassis device remain unchanged. By assigning to the new peer a number range that not overlap with the number ranges having been assigned to other peers, the new peer may announce itself by sending an LSP with an LSP number within the assigned number range. The LSPs generated by different peers do not conflict with each other because the LSP numbers included in the LSPs are different. Accordingly, there is no need for the peers to perform synchronization to be synchronous with each other. The peers may announce themselves independently. Furthermore, any of the current routing protocols is applicable in the disclosure, and a network node compliant with an existing routing protocol may cooperate with the peers according to the disclosure well.

The foregoing description of implementations provides illustration and description, but is not intended to be exhaustive or to limit the disclosure to the precise form disclosed. Modifications and variations are possible in light of the above teachings, or may be acquired from practice of the disclosure. For example, while blocks have been described with regard to FIGS. 3, 4, 5 and 8 in a specific order, the order of the blocks may be modified in other implementations consistent with the principles of the disclosure. Further, non-dependent blocks may be performed in parallel.

Aspects of the disclosure may also be implemented in methods and/or computer program products. Accordingly, the disclosure may be embodied in hardware and/or in hardware/software (including firmware, resident software, microcode, etc.). Furthermore, the disclosure may take the form of a computer program product on a computer-usable or computer-readable storage medium having computer-usable or computer-readable program code embodied in the medium for use by or in connection with an instruction execution system. The actual software code or specialized control hardware used to implement embodiments described herein is not limiting of the disclosure. Thus, the operation and behaviour of the aspects were described without reference to the specific software code—it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A method at a peer in an inter-chassis device comprising a plurality of peers, the method comprising:
   generating a first Link State Protocol Data Unit (PDU) (LSP) having a first LSP number, the first LSP number in the generated first LSP being a number in a number range assigned to said peer, wherein number ranges assigned to different peers of the plurality of peers do not overlap with each other;
   transmitting the generated first LSP;
   receiving a second LSP having a second LSP number; and determining, from the second LSP, whether another peer is present in the inter-chassis device, wherein the determining includes:
  comparing the second LSP number with the number range assigned to said peer in response to a SOURCE ID field in the second LSP indicating that the second LSP is received from the inter-chassis device; and
  determining, based on the comparison, that the second LSP is received from the another peer in the inter-chassis device if the second LSP number is out of the number range assigned to said peer, wherein the determination that the second LSP is received from the another peer in the inter-chassis device facilitates said peer to automatically discover other peers in the inter-chassis device.

2. The method according to claim 1, further comprising:
generating and transmitting an LSP with a specific LSP number which is not assigned to any of the plurality of peers,
wherein the LSP with the specific LSP number generated by each of the plurality of peers includes information about the inter-chassis device itself.

3. The method according to claim 2, wherein the specific LSP number is zero.

4. The method according to claim 1, wherein the first LSP, with the first LSP number within the number range assigned to said peer, includes peer-specific topology information of the inter-chassis device.

5. The method according to claim 1, further comprising determining that the second LSP is locally generated if the second LSP number falls in the number range assigned to said peer.

6. A peer in an inter-chassis device comprising a plurality of peers, said peer comprising:
  a processor configured to generate a first Link State Protocol Data Unit (PDU) (LSP) having a first LSP number, the first LSP number in the generated first LSP being a number in a number range assigned to said peer, wherein number ranges assigned to different peers of the plurality of peers do not overlap with each other; and
  a transceiver configured to:
    transmit the generated first LSP; and
    receive a second LSP having a second LSP number,
  wherein the processor is further configured to:
    compare the second LSP number with the number range assigned to said peer if a SOURCE ID field in the second LSP indicates that the second LSP is received from the inter-chassis device; and
    determine, based on the comparison, that the second LSP is received from another peer in the inter-chassis device if the second LSP number is out of the number range assigned to said peer, wherein the determination that the second LSP is received from the another peer in the inter-chassis device facilitates said peer to automatically discover other peers in the inter-chassis device.

7. The peer according to claim 6, wherein the processor is further configured to generate an LSP with a specific LSP number which is not assigned to any of the plurality of peers, and the generated LSP with the specific LSP number includes information about the inter-chassis device itself.

8. The peer according to claim 7, wherein the specific LSP number is zero.

9. The peer according to claim 6, wherein the first LSP, with the first LSP number within the number range assigned to said peer, includes peer-specific topology information of the inter-chassis device.

10. The peer according to claim 6, wherein the processor is further configured to determine that the second LSP is locally generated if the second LSP number falls in the number range assigned to said peer.

11. A peer in an inter-chassis device comprising a plurality of peers, said peer comprising:
  a communication interface arranged for communication;
  a processor; and
  a memory storing computer program code thereon which, when run in the processor, causes the peer to:
    select a number in a number range assigned to said peer;
    generate a first Link State Protocol Data Unit (PDU) (LSP) having a first LSP number by using the selected number as the first LSP number, wherein number ranges assigned to different peers of the plurality of peers do not overlap with each other;
    transmit the generated first LSP;
    receive a second LSP having a second LSP number; and
    determine, from the second LSP, whether another peer is present in the inter-chassis device, wherein the determination comprises the peer being further caused to:
      compare the second LSP number in the second LSP with the number range assigned to said peer if a SOURCE ID field in the second LSP indicates that the second LSP is received from the inter-chassis device; and
      determine, based on the comparison, that the second LSP is received from the another peer in the inter-chassis device if the second LSP number is out of the number range assigned to said peer, wherein the determination that the second LSP is received from the another peer in the inter-chassis device facilitates said peer to automatically discover other peers in the inter-chassis device.

12. The peer according to claim 11, which is further caused to generate an LSP with a specific LSP number which is not assigned to any of the plurality of peers, and wherein the generated LSP with the specific LSP number includes information about the inter-chassis device itself.

* * * * *